United States Patent [19]

Turley et al.

[11] 4,288,587
[45] Sep. 8, 1981

[54] PREPARATION OF NONCELLULAR POLYURETHANE COMPOSITIONS

[75] Inventors: Richard J. Turley, Orange; David R. MacFarland, Cheshire, both of Conn.

[73] Assignee: Olin Corporation, New Haven, Conn.

[21] Appl. No.: 146,856

[22] Filed: May 5, 1980

[51] Int. Cl.³ ............................................. C08G 18/22
[52] U.S. Cl. ..................................... 528/57; 528/76; 528/77; 528/171
[58] Field of Search .......................... 528/57, 76, 77; 521/171

[56] References Cited

U.S. PATENT DOCUMENTS

| | | | |
|---|---|---|---|
| 3,033,825 | 5/1962 | Murphy | 528/57 |
| 3,108,975 | 10/1963 | Lambert et al. | 521/110 |
| 3,239,480 | 3/1966 | Windemuth et al. | 260/31.2 N |
| 3,422,036 | 1/1969 | Ellegast et al. | 521/125 |
| 3,658,762 | 4/1972 | Cobbledick | 528/55 |
| 3,728,308 | 4/1973 | Allison et al. | 528/57 |
| 3,741,921 | 6/1973 | Lampkin | 521/171 |
| 3,860,565 | 1/1975 | Barber | 204/159.11 |
| 3,963,680 | 6/1976 | O'Keefe et al. | 528/55 |
| 4,007,079 | 2/1977 | Turley et al. | 260/45.95 G |
| 4,052,349 | 10/1977 | Turley et al. | 260/9 |
| 4,166,164 | 8/1979 | Cenker et al. | 521/129 |

*Primary Examiner*—Maurice J. Welsh
*Attorney, Agent, or Firm*—William D. Sabo

[57] ABSTRACT

Noncellular polyurethane compositions are prepared by reacting an organic polyisocyanate with select chlorine-containing polyols in the presence of a catalytic amount of a metal carboxylate compound. These reactions produce noncellular polyurethanes which are useful as coatings and castings.

13 Claims, No Drawings

4,288,587

PREPARATION OF NONCELLULAR POLYURETHANE COMPOSITIONS

This invention relates to a catalytic process for preparing chlorinated noncellular polyurethanes, and, more particularly, to a process for preparing the same by catalyzing the reaction of organic polyisocyanates with select chlorine-containing polyols.

The production of noncellular polyurethanes is achieved by reacting organic polyisocyanates with polyols; usually a catalyst is employed to effect or promote the reaction. Typical catalysts that can be used include amines and tin compounds. However, these catalysts are not effective in catalyzing the reaction when the polyol is a chlorine-containing polyol, such as that produced by condensing a polyhydroxy initiator with 4,4,4-trichloro-1,2-epoxybutane and a halogen-free epoxide. Thus, there is a need in the art for a process for preparing noncellular polyurethanes when chlorine-containing polyols are used as the polyol reactant.

It has now been discovered that chlorinated noncellular polyurethane compositions can be produced under relatively mild reaction conditions using select chlorine-containing polyols by reacting such polyols with organic polyisocyanates in the presence of an alkali or alkaline earth metal salt of a carboxylic acid. This discovery was unexpected, since such salt compounds are normally effective as catalysts to induce trimerization of isocyanates to isocyanurates. See Saunders and Frisch, *Polyurethanes: Chemistry and Technology*, Part I, Pages 94–97, Interscience Publishers, New York (1962); U.S. Pat. No. 3,860,565, issued on Jan. 14, 1975 to Barber, Jr.; and U.S. Pat. No. 3,963,680, issued on June 15, 1976 to O'Keefe et al. Pursuant to the process of the present invention, only trace amounts of isocyanurates are obtained, and this result was surprising because of the teachings of the prior art.

The polyol employed in the process of the present invention is a select chlorine-containing polyol and it is comprised of the product of condensing a polyhydroxy initiator with 4,4,4-trichloro-1,2-epoxybutane or a mixture of 4,4,4-trichloro-1,2-epoxybutane and a halogen-free epoxide.

The 4,4,4-trichloro-1,2-epoxybutane may be used in purified form or as a crude product of the dehydrohalogenation of 4,4,4-trichloro-2-halobutanol. Such crude product is described in U.S. Pat. No. 3,847,844, issued Nov. 12, 1974 to Fuzesi et al, the entire disclosure of which is incorporated herein by reference. It is thus to be understood that the term "4,4,4-trichloro-1,2-epoxybutane", as used in the specification and claims herein, includes either form of this compound. For brevity, the 4,4,4-trichloro-1,2-epoxybutane is hereinafter referred to as "TCBO".

The TCBO may be used alone or, pursuant to one preferred embodiment of the invention, in combination with varying proportions of a halogen-free epoxide such as ethylene oxide, propylene oxide, and butylene oxide. In accordance with this embodiment, the halogen-free epoxide, of which ethylene oxide and propylene oxide are preferred, may be used concurrently with the TCBO, i.e., random oxyalkylation, or step-wise, i.e., block oxyalkylation before or after the reaction of TCBO with the polyhydroxy initiator. These random and step-wise oxyalkylation techniques are well known and conventionally used in the prior art. In general, step-wise oxyalkylation is preferred wherein the TCBO is first reacted with the polyhydroxy initiator, the resulting condensate being thereafter "topped" with the halogen-free epoxide.

The polyhydroxy initiator used to prepare the chlorine-containing polyol can be any compound having from 2 to 8 hydroxy groups or a mixture of two or more such compounds. Illustrative polyhydroxy compounds include ethylene glycol, propylene glycol, butylene glycol, glycerol, trimethylolpropane, triethylolpropane, sorbitol, pentaerythritol, dextrose (hydrous or anhydrous), sucrose, methyl glucoside, mixtures thereof and the like.

The polyhydroxy initiator preferably contains an average of 2 to 6, and still more preferably 2 to 3, hydroxy groups. This is for the main reason that polyols having the indicated average range of functionality are generally less viscous than those having a higher hydroxy functionality. As such, they lend themselves to easier handling and processing.

Although the condensation reaction of the TCBO with the polyhydroxy initiator may proceed in the absence of a catalyst, the use of a catalyst is preferred. Any acidic catalyst which is known in the art to promote this type of a reaction may be used. A large variety of such catalyts, as illustrated by the Lewis acid catalysts, can be used. These include, for example, boron trifluoride and its etherate derivatives, ferric chloride, ferrous chloride, stannic chloride, titanic tetrachloride, antimony pentachloride, aluminium chloride, aluminum bromide, triethyl aluminum, zinc chloride, zinc bromide, tetrabutyl titanate and so forth. The use of boron trifluoride and its etherate derivatives is particularly preferred. Small or catalytic proportions of the acid catalyst are employed as will serve to promote the condensation reaction.

The acid catalyzed condensation is carried out at any suitable temperature which is effective in bringing about reaction of the TCBO with the polyhydroxy initiator without otherwise adversely affecting the reaction or the product thereof. Temperatures ranging from about 30° C. to about 200° C. are illustrative. In carrying out the condensation reaction, any suitable relative proportions of reactants may be used provided at least 1 mole of TCBO is employed per every mole of polyhydroxy initiator. Usually such proportions are used to yield a chlorine-containing polyol product having a molecular weight ranging from about 194 to about 9,600 and preferably about 410–5,600. In accordance with the more preferred embodiments of the invention, the proportion of TCBO that is condensed with the polyhydroxy initiator ranges from about 0.1 to about 6, and still more preferably about 1–5, moles per each hydroxy group in the initiator. Where a halogen-free epoxide is also used in preparing the chlorine-containing polyol, this can be employed in any suitable proportion such as about 0.1 to about 10, preferably about 0.2–5, and most preferably about 0.4–1, moles of halogen free epoxide per every mole of TCBO that is used.

The organic polyisocyanate used in preparing the polyurethane composition of the invention preferably has a functionality of 2–4, and it most preferably has a functionality of 2–3. Suitable polyisocyanate compounds for the process of this invention include: toluene diisocyanate, such as the 4:1 and 65:35 mixtures of the 2,4- and 2,6-isomers, methylene bis(phenylisocyanate), 1,5-naphthalene diisocyanate, 1,3-phenylene diisocyanate, the xylylene diisocyanates, 3,3'-bitoluene diisocyanate, the polymethylene polyphenylisocyanates, hexamethylene diisocyanate, propylene diisocyanate, mixtures thereof and the like. In practice, certain aliphatic-aromatic polyisocyanates, such as toluene diisocyanate, methylene bis(phenylisocyanate), the polymethylene polyphenylisocyanates and mixtures thereof are preferred due to the fact that these materials are readily available commercially and have gained wide acceptance for use in the production of polyurethanes. The most preferred polyisocyanates used in the practice of the present invention are toluene diisocyanate and methylene bis(phenylisocyanate).

The catalyst compounds that are useful in the process of this invention are metal carboxylate compounds which are either alkali or alkaline earth metal salts of carboxylic acids. However, it should be noted that a mixture of two or more of such compounds may be used. The metal or cation part of the salt includes the metals which are contained in both Groups I and II of the Periodic Table. Preferred embodiments utilize as the metal part of the catalyst, the following metals: lithium, sodium, potassium, magnesium or calcium. The most preferred metals are sodium and potassium. The carboxylic acid or anion part of the salt can be derived from either aliphatic or aromatic carboxylic acids, and it is preferably derived from aliphatic carboxylic acids having up to 18, and preferably 1-6, carbons. Examples of suitable carboxylic acids from which the anion part of the salt may be derived are the following: acetic, propionic, butyric, stearic, benzoic or naphthoic. It should be understood, however, that the anion part of the salt may be derived from these and other equivalent acids including other aliphatic and aromatic acids which may be substituted with conventional inert substituents such as, for example, halogen, nitro and the like. The most preferred catalysts are sodium acetate, potassium acetate, and mixtures thereof.

The metal carboxylate compounds can be prepared in conventional fashion by techniques well known to those skilled in the art. Examples of methods which can be followed in preparing such salt compounds can be found in Morrison and Boyd, *Organic Chemistry*, second edition, pages 589 and 593-601, published by Allyn and Bacon, Inc., (1966).

The catalyst, be it a single compound as disclosed herein or a combination of such compounds, may be used in any suitable proportion which is effective in catalyzing the reaction. Thus, the term "catalytic amount" as used in the specification and claims herein, is intended to encompass any such proportion. For illustration, the catalytic proportion may range from about 0.05 to about 1.0, and more commonly about 0.1 to about 0.4 percent, by weight, based on the polyol. The amount of catalyst used in the practice of this invention will depend upon the particular salt compound utilized and also upon the particular reactants and reaction conditions employed.

In accordance with the process of the invention, the metal carboxylate compounds are used as catalysts in preparing chlorinated polyurethanes. First, a catalytic amount of the metal salt is added to the select chlorine-containing polyol. This combination is then preferably heated to a temperature in the range of about 40° to 70° C., and more preferably in the range of about 50° to 60° C. Next, the heated polyol containing the salt is simply added to, and mixed with, the organic polyisocyanate. Thereafter, the mixture is allowed to cure into a hard substance. Ordinarily, such curing will take place at room temperature, so that heating is not necessary, although the use of heat may be preferred in actual practice in order to enhance or speed up the curing process. Generally, when it is desired to cure the product at an elevated temperature, a temperature in the range of about 30° to 200° C., and more preferably in the range of about 50° to 120° C., is employed. The process of this invention provides polyurethane compositions which gel and cure relatively rapidly to noncellular polyurethane compositions.

Upon curing, the polyurethane composition exhibits desirable flame retardance and hardness properties. As such, it is used to advantage, according to the method of the invention, as an improved coating or cast elastomer. For example, by virtue of its flame retardance properties, it is particularly suited for use in coating combustible materials. It is also useful in numerous casting applications, such as roller skate wheels, conveyor rollers, automobile front and rear ends, bumpers, etc. where impact resistance is important.

The following examples will serve to illustrate the preparation of noncellular polyurethane compositions in accordance with the process of this invention. In the examples, the chlorine-containing polyols used are products of the condensation, in the presence of boron tirfluoride etherate catalyst, of 1 mole of ethylene glycol first with 8 moles of TCBO and then with 4 moles of ethylene oxide. Accompanied by continuous stirring, the solution is made gradually while maintaining a temperature of about 40°-65° C. After completion of the addition, the reaction is allowed to go to completion. Then, the acidic catalyst is neutralized with diethanolamine and the volatile components of the reaction product are stripped off at a temperature of about 40° C. and a pressure of about 0.45 m.m. of mercury. The chlorine-containing polyols had a hydroxyl number of 84 mg KOH/g.

EXAMPLE I

The amount of 50 grams of a polyol containing 99.6 weight percent of the chlorine-containing polyol formed in accordance with the procedure as described hereinabove and 0.4 weight percent of sodium acetate was heated to a temperature of about 50°-60° C. The polyol was then added to, and mixed with, the amount of 9.8 grams of methylene bis(phenylisocyanate). This system was allowed to stand at room temperature, and the "gel time" was measured. The "gel time" is the time which lapses after the reactants are mixed until there is no apparent flowing of polyurethane material after a sample is tipped to about a 45 degree angle. The gel time was found to be almost instantaneous.

EXAMPLE II

The procedure of Example I was followed except that the polyol contained 0.2 weight percent of sodium acetate. The gel time was found to be about 1 hour at a temperature of about 100° C. The polyurethane product was cast in a film; and, on visual examination, the cooled and cured film had a high gloss, and it had a hardness of about 35-40 (as measured on the D scale of a Shore Durometer, Shore Instrument and Manufacturing Co., Inc.).

EXAMPLE III

The procedure of Example I was followed except that the polyol contained 0.1 weight percent of sodium acetate. The gel time was found to be about 16 hours at a temperature of about 100° C.

What is claimed is:

1. A process for preparing a noncellular polyurethane which comprises reacting an organic polyisocyanate with a chlorine-containing polyol in the presence of a catalytic amount of a metal carboxylate compound selected from the group consisting of an alkali metal salt of a carboxylic acid, an alkaline earth metal salt of a carboxylic acid and mixtures thereof, said chlorine-containing polyol having an average of 2-8 hydroxy groups and being comprised of the product of the acid-catalyzed condensation of a polyhydroxy initiator with 4,4,4-trichloro-1,2-epoxybutane or a mixture thereof with a halogen-free epoxide.

2. The process as recited in claim 1, wherein the metal part of said metal carboxylate compound is selected from the group consisting of lithium, sodium, potassium, magnesium and calcium, and the carboxylic acid part of said metal carboxylate compound is derived from the group consisting of acetic acid, propionic acid, butyric acid, stearic acid, benzoic acid and naphthoic acid.

3. The process as recited in claim 2, wherein said metal carboxylate compound is sodium acetate, potassium acetate or a mixture thereof.

4. The process as recited in claim 1, wherein said chlorine-containing polyol has an average of 2-3 hydroxy groups.

5. The process as recited in claim 4, wherein said chlorine-containing polyol is a condensate of a polyhydroxy initiator first with 4,4,4-trichloro-1,2-epoxybutane and then with a halogen-free epoxide.

6. The process as recited in claim 5, wherein said polyhydroxy initiator is glycerol, ethylene glycol or a mixture thereof.

7. The process as recited in claim 6, wherein said metal carboxylate compound is sodium acetate, potassium acetate or a mixture thereof.

8. The process as recited in claim 1, wherein said organic polyisocyanate is toluene diisocyanate, methylene bis(phenylisocyanate) or a mixture thereof.

9. The process as recited in claim 8, wherein said chlorine-containing polyol has an average of 2-3 hydroxy groups.

10. The process as recited in claim 9, wherein said chlorine-containing polyol is a condensate of a polyhydroxy initiator first with 4,4,4-trichloro-1,2-epoxybutane and then with a halogen-free epoxide;
said polyhydroxy initiator is glycerol, ethylene glycol or a mixture thereof; and
said metal carboxylate compound is sodium acetate, potassium acetate or a mixture thereof.

11. A noncellular polyurethane prepared according to the process of claim 1.

12. A noncellular polyurethane prepared according to the process of claim 4.

13. A noncellular polyurethane prepared according to the process of claim 10.

* * * * *

UNITED STATES PATENT AND TRADEMARK OFFICE
CERTIFICATE OF CORRECTION

PATENT NO. : 4,288,587
DATED : September 8, 1981
INVENTOR(S) : Richard J. Turley and David R. MacFarland It is certified that error appears in the above—identified patent and that said Letters Patent is hereby corrected as shown below:

Column 4, line 25, "tirfluoride" should read --trifluoride--.

Column 4, line 28, "solution" should read --addition--.

Signed and Sealed this

Twenty-fifth Day of May 1982

[SEAL]

Attest:

Attesting Officer

GERALD J. MOSSINGHOFF

Commissioner of Patents and Trademarks